United States Patent
Suzuki et al.

(10) Patent No.: US 8,797,552 B2
(45) Date of Patent: Aug. 5, 2014

(54) APPARATUS FOR GENERATING THREE-DIMENSIONAL IMAGE OF OBJECT

(75) Inventors: Satoshi Suzuki, Hamamatsu (JP);
 Kengo Suzuki, Hamamatsu (JP);
 Masaki Takabayashi, Hamamatsu (JP);
 Yoichi Sano, Hamamatsu (JP);
 Masahiro Suzuki, Hamamatsu (JP)

(73) Assignees: Leica Geosystems AG, Heerbrugg (CH);
 Hexagon Metrology Kabushiki Kaisha, Hamamatsu (JP)

( * ) Notice: Subject to any disclaimer, the term of this patent is extended or adjusted under 35 U.S.C. 154(b) by 353 days.

(21) Appl. No.: 13/378,267

(22) PCT Filed: Jul. 3, 2009

(86) PCT No.: PCT/EP2009/058445
 § 371 (c)(1),
 (2), (4) Date: Jan. 26, 2012

(87) PCT Pub. No.: WO2011/000435
 PCT Pub. Date: Jan. 6, 2011

(65) Prior Publication Data
 US 2012/0113435 A1    May 10, 2012

(51) Int. Cl.
 *G01B 11/24* (2006.01)
 *G01B 11/28* (2006.01)
 *G01B 11/30* (2006.01)
 *G01B 11/25* (2006.01)

(52) U.S. Cl.
 CPC .................................. *G01B 11/2518* (2013.01)
 USPC ............................................ 356/612; 356/629

(58) Field of Classification Search
 USPC ..................... 356/237.1–241.6, 242.1–243.8, 356/426–431, 600–640
 See application file for complete search history.

(56) References Cited

U.S. PATENT DOCUMENTS

| | | | | |
|---|---|---|---|---|
| 4,567,347 A | * | 1/1986 | Ito et al. | 219/124.34 |
| 5,754,215 A | * | 5/1998 | Kataoka et al. | 347/235 |
| 5,844,227 A | * | 12/1998 | Schmidt et al. | 235/472.01 |
| 5,848,188 A | * | 12/1998 | Shibata et al. | 382/203 |
| 6,144,366 A | * | 11/2000 | Numazaki et al. | 345/156 |
| 6,347,198 B1 | * | 2/2002 | Yamamoto et al. | 399/27 |
| 6,441,908 B1 | | 8/2002 | Johnston et al. | |
| 7,158,241 B2 | * | 1/2007 | Slesinski et al. | 356/620 |
| 2008/0024793 A1 | | 1/2008 | Gladnick | |

FOREIGN PATENT DOCUMENTS

| | | |
|---|---|---|
| CN | 101334897 A | 12/2008 |
| EP | 1431803 A2 | 6/2004 |
| GB | 2204947 A | 11/1988 |
| JP | 06042958 A | 2/1994 |

(Continued)

*Primary Examiner* — Kara E Geisel
*Assistant Examiner* — Jarreas C Underwood
(74) *Attorney, Agent, or Firm* — Maschoff Brennan

(57) ABSTRACT

A non-contact laser triangulation scanning apparatus for generating a three-dimensional image of the surface of an object based on the 3D surface position and surface contrast information. The apparatus comprises a laser source, a first optical unit, a second optical unit, a photosensitive positional detector having a plurality of sensor elements, and an incident light measurement device. According to generated timing signals having a predetermined time interval, a reset timing of the sensor elements of the photosensitive positional detector is controlled. The incident light measurement device measures an amount of a certifying laser light after one timing signal. An amount of a measurement laser light is determined dependent on the measured amount of the certifying laser light. The three-dimensional image is generated by combining position data derived from signals of the positional detector with contrast data derived at least from signals of the incident light measurement device.

17 Claims, 13 Drawing Sheets

(56) References Cited

FOREIGN PATENT DOCUMENTS

| JP | 07260477 | A | 10/1995 |
| JP | 07301521 | A | 11/1995 |
| JP | 08297017 | A | 11/1996 |
| JP | 10038511 | A | 2/1998 |
| JP | 11101936 | A | 4/1999 |
| JP | 2000097629 | A | 4/2000 |
| JP | 2001183117 | A | 7/2001 |
| JP | 2002092632 | A | 3/2002 |
| JP | 2002092632 | B2 | 3/2002 |
| JP | 2006153813 | A | 6/2006 |

* cited by examiner

APPARATUS FOR GENERATING THREE-DIMENSIONAL IMAGE OF OBJECT

FIELD OF THE INVENTION

The present invention relates to an apparatus for generating a three-dimensional image of the surface of an object by use of a non-contact laser triangulation sensor.

BACKGROUND

Generally, such laser scanning apparatuses are well known in the prior art and built for measuring the three-dimensional shape of a surface of an object, e.g. by generating a point cloud representing a plurality of points on the object-surface. Hence, a three-dimensional image of the surface of the object to be measured can be generated.

A conventional three-dimensional imaging apparatus with use of a non-contact sensor includes a shape measurement apparatus for measuring a shape of a surface of an object with use of the non-contact sensor and outputting measured data (JP 3554264), a computer for processing the measured data outputted from the shape measurement apparatus, and a display device for displaying a three-dimensional image of the surface of the object with control of the computer.

FIG. 6 is a schematic diagram of an optical unit of the conventional shape measurement apparatus, which includes a laser diode 111, a beam expander 112, a first mirror 113, a second mirror 114, and a third mirror 115. A light emitted from the laser diode 111 travels the first mirror to the third mirror 113-115 and irradiates the object to be measured. The light reflected from the surface of the object travels the third mirror 115, the second mirror 114, a fourth mirror 116, an imaging lens portion 117, and enters a CCD line sensor portion 118 as the non-contact sensor. In the shape measurement apparatus, a case receiving the optical unit is rotatable about an X-axis and the third mirror 115 is rotatable about a Y-axis to scan the surface of the object with the laser diode 111.

FIG. 7 shows a principle of the three-dimensional imaging apparatus. The light emitted from the laser diode 111 irradiates the surface of the object to be measured and the light reflected from the surface is converged with an imaging lens 117a of the imaging lens portion 117 and imaged onto a line sensor 118a of the CCD line sensor portion 118. An imaging position of the reflected light on the line sensor 118a is outputted from the shape measurement apparatus as the measurement data. The computer calculates the three-dimensional shape of the surface of the object with use of a triangulation method utilized for a distance meter. The line sensor 118a also measures an amount of the reflected light to obtain a contrast information of the surface of the object and generate the three-dimensional image of the object.

FIG. 8 is a block diagram of the three-dimensional imaging apparatus. An electrical control apparatus 150 controls the laser diode 111 and is connected to an encoder 121 to detect angle of rotation of a motor 119 to rotate the third mirror 115. Signals are outputted from the electrical control apparatus 150 to a computer 200. The signals are converted into image signals through a coordinate conversion portion 210 and an image process portion 220 to display the three-dimensional image.

In the three-dimensional imaging apparatus shown in FIG. 8, the encoder 121 is attached to the motor 119 to rotate the third mirror 115. The encoder 121 generates an encoder pulse signal to rotate the third mirror 115 about the Y-axis so that the irradiation position of the laser light is detected. The reflected light from the irradiation position is cumulatively stored as electrical charges in a CCD device of the line sensor 118a of the CCD line sensor portion 118 for a period of time between one encoder pulse signal and a next encoder pulse signal. A total amount of the electrical charges stored in the CCD device for the time interval between the encoder pulse signals is measured as the amount of light reflected from the irradiated position.

The CCD device has a reset timing to discharge the stored electrical charge. When the encoder pulse signal of the encoder 121 is not synchronized with the reset timing of the CCD in the conventional three-dimensional imaging apparatus, as shown in FIG. 9, the total amount of the electrical charge stored in the CCD device does not represent the cumulative electrical charge stored between the encoder pulse signals. Accordingly, the conventional three-dimensional imaging apparatus does not measure the correct amount of light reflected from the irradiation position.

SUMMARY

An object of the present invention is to provide an improved apparatus for generating a three-dimensional image having a correct position and contrast information of an object based on measurement of a correct amount of a laser light reflected from a surface of the object at a radiation position.

This object is achieved by realising the features of the independent claims. Features which further develop the invention in an alternative or advantageous manner are described in the dependent patent claims.

According to a first object of the present invention, a scanning apparatus for generating a three-dimensional image of an object comprises a laser source for emitting a laser light; a first optical unit for irradiating the laser light emitted from the laser source towards a surface of the object to be measured; a second optical unit for imaging the laser light reflected from the surface of the object; a photosensitive detector having a plurality of sensor elements, for detecting an imaging position of the laser light from the second optical unit; an incident light measurement device for measuring an amount of received laser light, which corresponds to the amount of laser light entering the photosensitive detector; and a processing unit. Therein, the processing unit is built for controlling the scanning apparatus in such a way, that a plurality of timing signals are generated having a predetermined time interval, the timing signals control a reset timing of a sensor element of the photosensitive detector, a certifying laser light is irradiated from the laser source after one timing signal for a period of time shorter than the predetermined time interval, an amount of the certifying laser light reflected from the surface of the object is measured with the incident light measurement device, and an amount of the measurement laser light emitted from the laser source is determined dependent on the amount of the certifying laser light measured with the incident light measurement device.

Particularly, the laser source is built as a laser diode.
Particularly, the photosensitive detector is built as a line sensor (e.g. a CCD or CMOS line sensor) or as an area sensor (e.g. a CCD or CMOS area sensor/matrix sensor).

Particularly, the scanning apparatus further comprises a movement device for moving an irradiation position of the laser light emitted from the laser diode and a detection device for detecting movement of the movement device. Therein, the plurality of timing signals can be generated by a detection signal outputted from the detection device. However, alternatively, the plurality of timing signals may also be triggered by the control unit.

Particularly, contrast information of the object-surface can be derived at least from signals of the incident light measurement device (considering the measured amount of the certifying laser light). Therefore, the output of the incident light measurement device may be used for determining contrast information of the surface of the object to be measured. Alternatively or additively, the amount of the measurement laser light may also be considered for the determination of contrast information of the surface of the object to be measured. Exemplarily, the contrast information of the object-surface can be determined dependent on the amount of received laser light measured by the incident light measurement device, the amount of received laser light measured by the photosensitive positional detector and/or the amount of the laser light emitted by the laser source (which themselves are already dependent from one another according to the invention).

Particularly, the amount of the measurement laser light is determined with a length of emission time of the laser source. Alternatively or additively, the amount of the measurement laser light can also be determined with controlling the intensity of light of the laser source.

Particularly, the measurement laser light is irradiated a plurality of times for the predetermined time interval, the amount of one measurement laser light is measured with the incident light measurement device, and a next light intensity of the measurement laser light emitted from the laser source is determined with the amount of the one measurement laser light determined with the incident light measurement device.

Particularly, the incident light measurement device has a plurality of amplifiers in response to the intensity of the laser light.

In a specific embodiment of the three-dimensional imaging apparatus of the present invention, a detection signal outputted from a detection device generates a plurality of timing signals having a predetermined time interval, and the timing signals control a reset timing of a CCD of a CCD line sensor portion. An amount of light entering the CCD line sensor portion thus corresponds to an irradiation position. Accordingly, the apparatus correctly measures the amount of the light reflected from the irradiation position.

A certifying laser light is irradiated from the laser diode after one timing signal for a period of time shorter than the predetermined time interval. An amount of the certifying laser light is measured with the incident light measurement device. An amount of the measurement laser light emitted from the laser diode is determined with the amount of the certifying laser light measured with the incident light measurement device. Accordingly, the amount of the measurement laser light entering the CCD line sensor portion is always in a range of electrical charges storable in the CCD line sensor portion without influence of a reflectivity of the surface of the object or a distance between the object and a shape measurement apparatus so that the amount of the measurement laser light reflected from the object is correctly measured.

The apparatus of the present invention generates a clear and correct three-dimensional image of the object by assigning contrast information to the correct coordination of the three-dimensional shape data.

The amount of the measurement laser light is determined with a length of an emission time of the laser diode so that the apparatus can utilizes the measurement laser light having a constant intensity.

The amount of the measurement laser light is determined with an intensity of light of the laser diode so that the apparatus can utilizes the measurement laser light having a constant emission time.

A next intensity of the measurement laser light emitted from the laser diode is determined with an amount of one measurement laser light. Accordingly, the amount of the measurement laser light reflected from the object and entering the CCD device is always in the range of electrical charges storable in the CCD device without influence of the reflectivity of the surface of the object or the distance between the object and the shape measurement apparatus so that the amount of the measurement laser light reflected from the object is correctly measured. The contrast information is then combined with the coordination of the correct three-dimensional shape data.

The incident light measurement device has a plurality of amplifiers in response to a large and small intensity of the laser light so as to assure a wide dynamic range in response to a large and small amount of the reflected light. Accordingly, the apparatus acquires the contrast information having the wide dynamic range.

BRIEF DESCRIPTION OF THE DRAWINGS

The invention will be explained in greater detail below with reference to examples of possible embodiments shown schematically in the drawings, in which.

DETAILED DESCRIPTION

Figure 1:
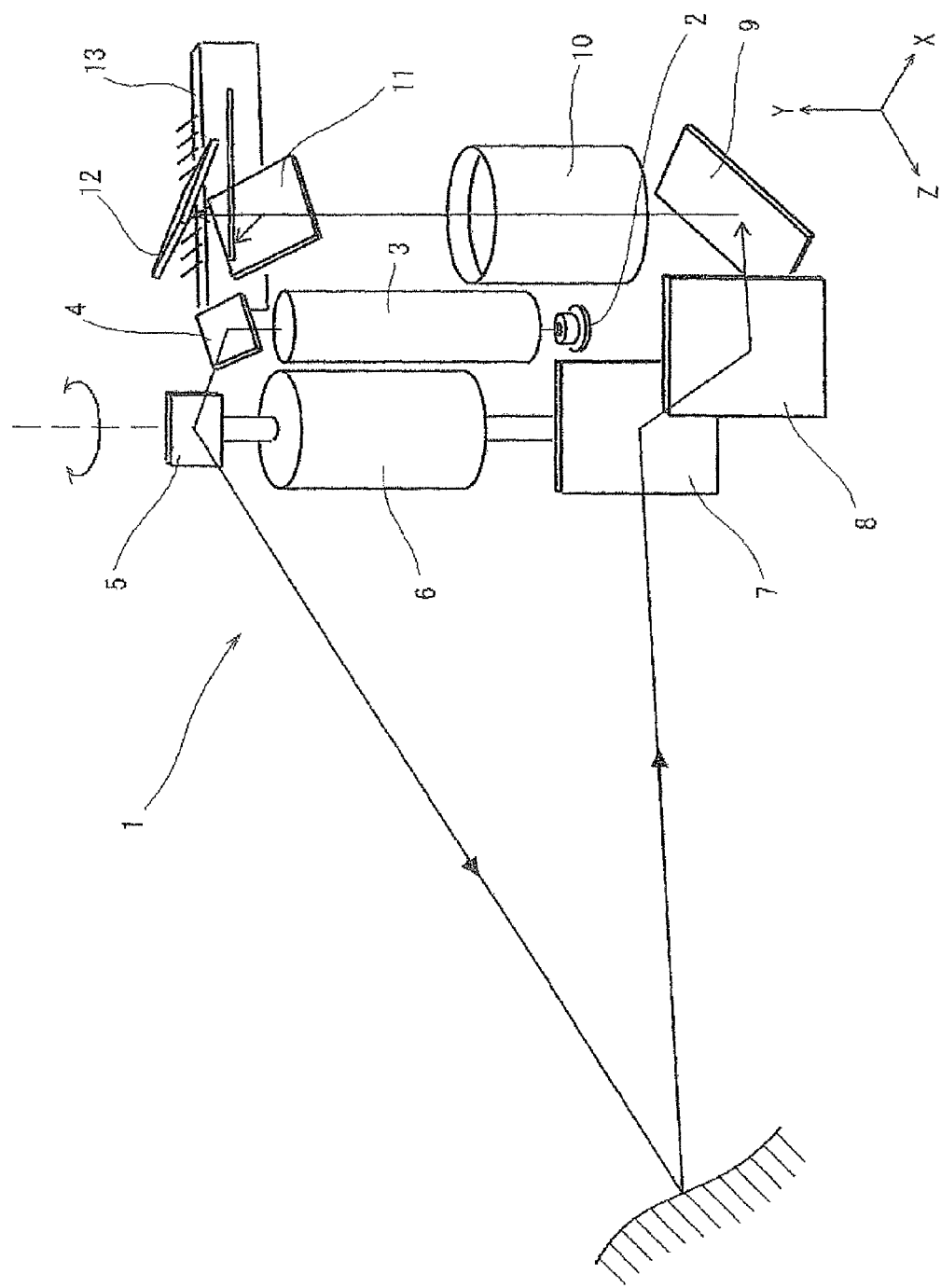
FIG. 1 is a perspective view of an optical unit of a shape measurement apparatus of a three-dimensional imaging apparatus of a first embodiment of the present invention.

A first embodiment of the present invention is explained with reference to FIGS. 1-4. An apparatus for generating a three-dimensional image (also referred to a three-dimensional imaging apparatus) includes a laser diode 2 to emit a laser light, a first optical unit to irradiate the laser light emitted from the laser diode 2 to a surface of an object to be measured, a movement device to move the irradiation position of the laser light emitted from the laser diode 2, an encoder 6a (detection device) to detect movement of the movement device, a second optical unit to image the laser light reflected from the surface of the object, a CCD line sensor portion 13 to detect the imaging position of the laser light received from the second optical unit, and an incident light measurement device disposed on the second optical unit to measure an amount of light entering the CCD line sensor portion 13. A plurality of timing signals having a predetermined time interval are generated with detection signals outputted from the detection device. The timing signals control reset timings of a CCD of the CCD line sensor portion 13. The laser diode 2 emits a certifying laser light after one timing signal for a period of time shorter than the predetermined time interval. The incident light measurement device measures an amount of the certifying laser light. An amount of a measurement laser light emitted from the laser diode 2 is determined by the amount of the certifying laser light measured with the incident light measurement device. Data outputted from the incident light measurement device are utilized as the contrast information for generating the three-dimensional image of the object.

The first optical unit includes a beam expander 3, a first mirror 4, and a second mirror 5. The second optical unit includes a third mirror 7, a fourth mirror 8, a fifth mirror 9, an imaging lens portion 10, and a half mirror 11.

The three-dimensional scanning apparatus—working according to the measuring principle of triangulation—includes a shape measurement apparatus to measure the surface of the object with the CCD line sensor portion 13 and output the measured data, a computer 30 to process the data outputted from the shape measurement apparatus, and a display device, not shown, controlled by the computer to display the three-dimensional image.

The shape measurement apparatus is usually attached to an end portion of a Portable Arm Coordinate Measuring Machine or of a Computer Controlled or Manually Operated Coordinate Measuring Machine, not shown, (hereafter referred to PCMM/CMM). The coordinate and orientation data of the end portion of the PCMM/CMM are outputted to the computer 30.

FIG. 1 is a perspective view showing an optical unit 1 of the shape measurement apparatus of the embodiment of the three-dimensional imaging apparatus. The light emitted from the laser diode 2 is irradiated to the surface of the object to be measured via the first optical unit. The beam expander 3 of the first optical unit is utilized to keep a diameter of the laser beam small in a range of a measurement distance. The first mirror 4 and the second mirror 5 are arranged to change the direction of the laser light.

The second mirror 5 is attached to one end of a rotation axle of a swing motor 6 and rotatable about a Y-axis shown in FIG. 1. The rotation of the second mirror 5 horizontally moves the irradiation position of the laser light on the surface of the object. The third mirror 7 is also attached to another end of the rotation axle of the swing motor 6 and rotates by the same angle as the second mirror 5. The second mirror 5, the swing motor 6, and the third mirror 7 constitute the movement device to move the irradiation position of the laser light emitted from the laser diode 2. The scanning in the vertical direction on the surface of the object is achieved with rotation about an X-axis of the entire case (not shown) receiving the optical unit. The data about the rotation angle of the case are also outputted to the computer 30.

Figure 3:
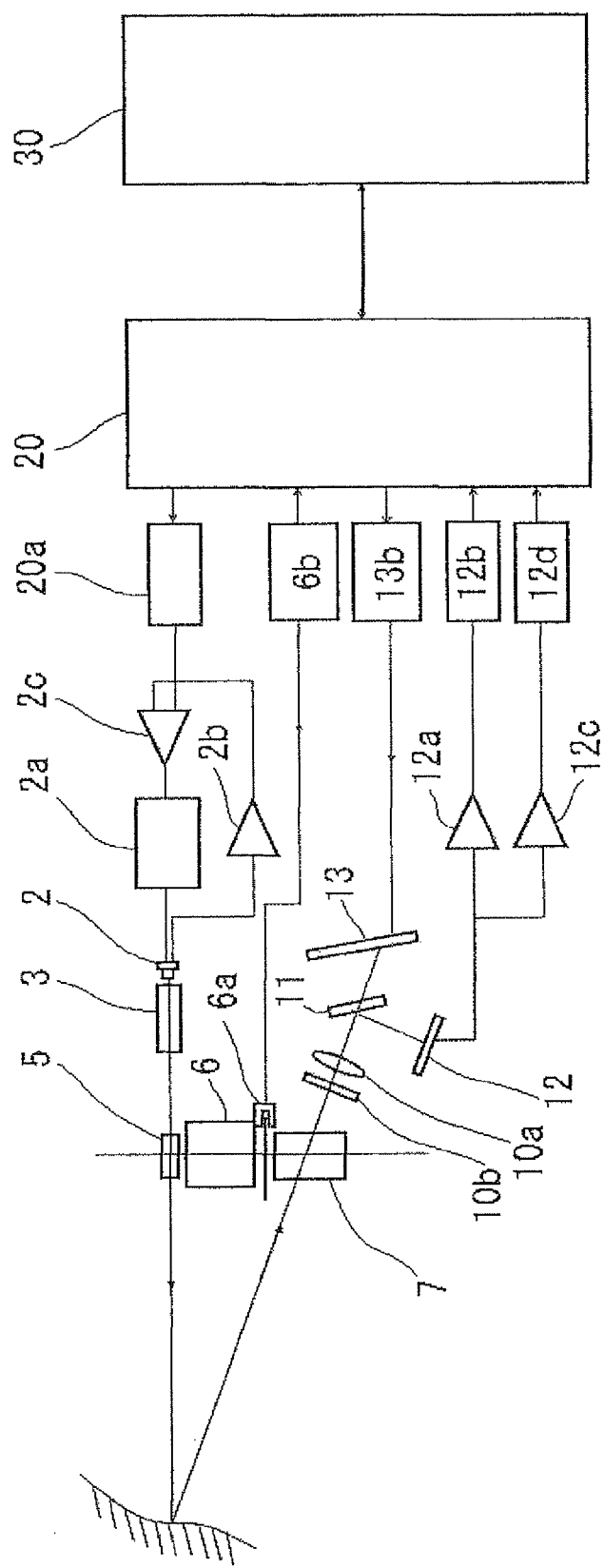
FIG. 3 is a block diagram showing a configuration of the shape measurement apparatus of the embodiment of FIG. 1.

The encoder 6a, refer to FIG. 3, is attached to the swing motor 6 as the detection device to detect movement of the movement device. The encoder 6a outputs the rotation position of the swing motor 6 as the detection signal. The plurality of the timing signals having the predetermined time interval are generated from the detection signals by mean of an FPGA 20 (Field Programmable Gate Array) shown in FIG. 3.

The second optical unit is arranged to image the laser light reflected from the surface of the object. The third mirror 7, the fourth mirror 8, the fifth mirror 9, and the half mirror 11 are arranged to change the direction of the laser light and pass the laser light. The imaging lens portion 10 is arranged to collect the reflected light and to image its light on a line sensor 13a of the CCD line sensor portion 13. The third mirror 7 is in conjunction with the second mirror 5 and rotatable about the Y-axis by means of the swing motor 6, see FIG. 1, so that the laser light reflected from the surface of the object enters the third mirror 7 with an incident angle corresponding to the radiation angle of the laser light to the surface of the object. The imaging lens portion 10 has an imaging lens 10a and a band pass filter 10b. The CCD line sensor portion 13 has the line sensor 13a to measure the imaging position of the reflected light.

A photodiode 12 is disposed to receive the light reflected from a surface of the half mirror 11 and to detect the amount of the reflected light.

Figure 2:
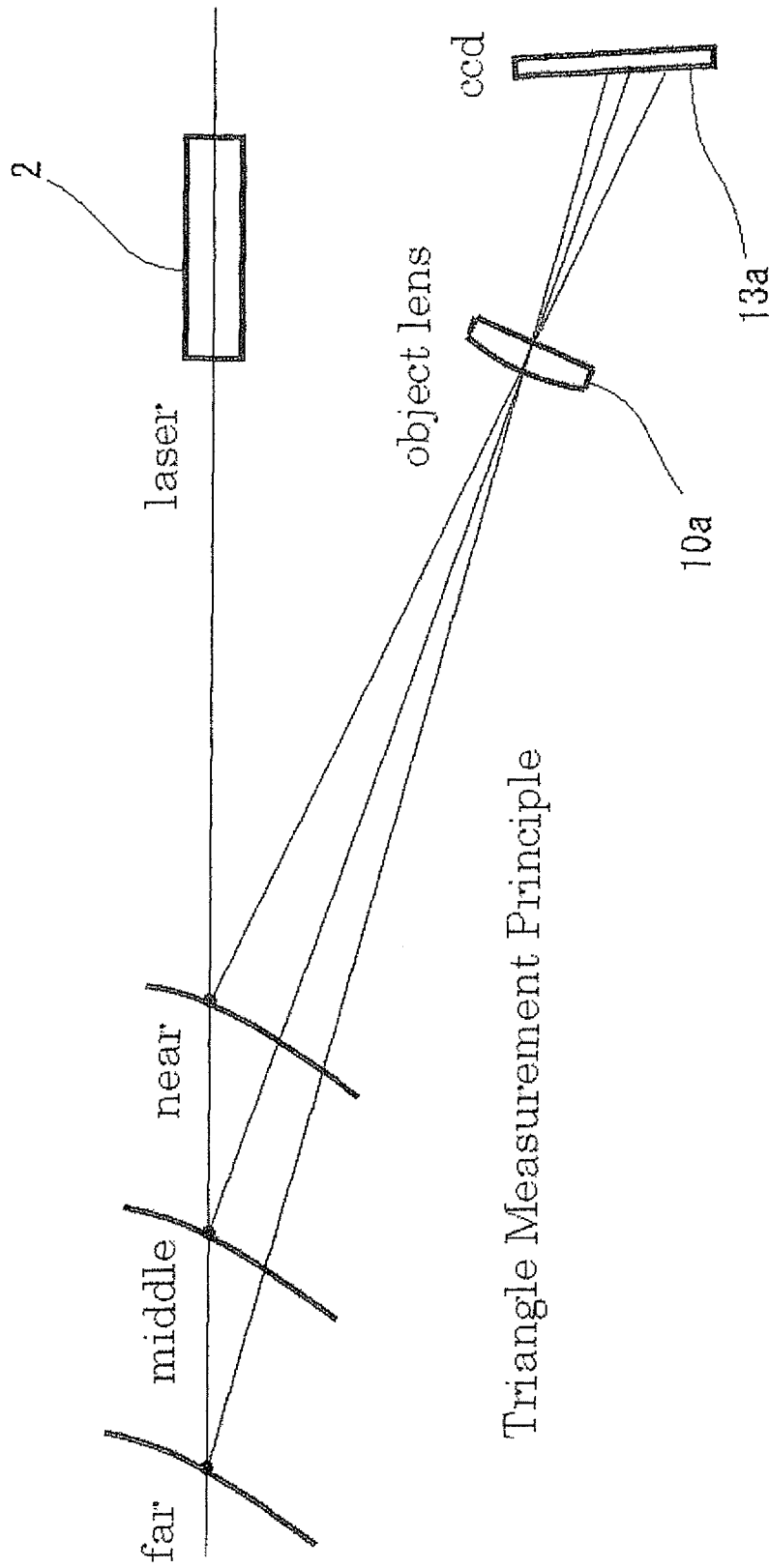
FIG. 2 illustrates a principle of measurement of the three-dimensional imaging apparatus of FIG. 1.

FIG. 2 shows a principle of measurement of the three-dimensional imaging apparatus. The laser light emitted from the laser diode 2 is irradiated on the surface of the object to be measured. The light reflected from the surface of the object is converged with the imaging lens 10a of the imaging lens portion 10 and imaged on the line sensor 13a of the CCD line sensor portion 13. The imaging position of the reflected light on the line sensor 13a is outputted as the measurement data from the shape measurement apparatus. The computer applies a triangulation method, which is utilized in the distance measurement, to the measurement data and calculates the three-dimensional shape of the object.

FIG. 3 illustrates a control system of the three-dimensional imaging apparatus. A laser diode driver 2a driving the laser diode 2 is controlled by the FPGA 20 and feedback controlled by an auto power control. The auto power control is achieved with a detection value of the amount of light measured by a photo-sensor disposed adjacent an illuminant in the laser diode 2. The amount of light of the laser diode 2 detected by the photo sensor is inputted to an amplifier 2b and further inputted to a comparator 2c. The emission time and the amount of the light emitted from the laser diode 2 are controlled by the FPGA 20. Digital signals outputted from the FPGA 20 are converted into analog signals with a D/A converter 20a and inputted to the comparator 2c. The comparator 2c receives both the feedback control signal of the auto power control and the control signal of the FPGA 20, and inputs both signals to the laser diode driver 2a.

The encoder 6a attached to the swing motor 6 detects the position of rotation of the swing motor 6 as a detection signal, and inputs the detection signal to the FPGA 20 through an encoder converter 6b.

The CCD line sensor portion 13 is connected to the FPGA 20 through a CCD driver 13b. The FPGA 20 controls the reset timing of the respective CCDs of the line sensor 13a.

The photo diode 12 is connected to a first amplifier 12a and a second amplifier 12c. The first amplifier 12a is connected to the FPGA 20 through an A/D converter 12b and the second amplifier 12c is connected to the FPGA 20 through an A/D converter 12d. The photo diode 12, the first and the second amplifier 12a, 12c, and the A/D converters 12b, 12d constitute the incident light measurement device.

The first amplifier 12a is set at a high amplification factor and the second amplifier 12c is set at a low amplification factor. When the reflected light detected with the photo diode 12 is a small amount, the detection signal is inputted to the FPGA 20 through the first amplifier 12a and the A/D converter 12b. When the reflected light detected with the photo diode 12 is a large amount, the detection signal is inputted to the FPGA 20 through the second amplifier 12a and the A/D converter 12d. The apparatus thus has a wide dynamic range in response to the small and large amount of the reflected light.

Figure 4:
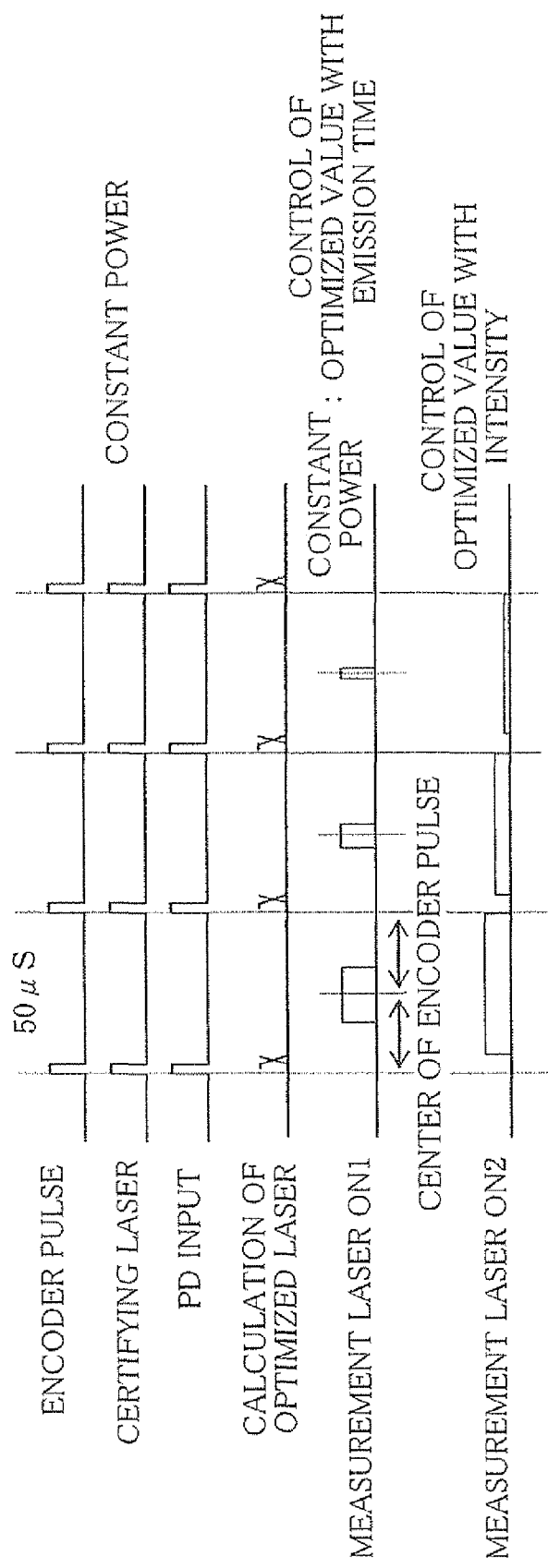
FIG. 4 is a timing chart of a control system of the shape measurement apparatus of the embodiment of FIG. 1.

FIG. 4 illustrates a timing chart of the control system of the shape measurement apparatus.

The encoder 6a (detection device) transmits the detection signal, indicated as "encoder pulse" in FIG. 4, to the FPGA 20, and the FPGA 20 generates the timing signal from the detection signal. One timing signal is generated from one detection signal of the encoder 6a and a next timing signal is generated from a next detection signal. The time interval between the timing signals is the predetermined time interval.

The laser diode driver 2a is controlled with the timing signal after generation of the one timing signal and the certifying laser light, indicated by "certifying laser" in FIG. 4, is emitted from the laser diode 2. The intensity of the certifying laser light is determined beforehand so that the amount of the reflected light of the certifying laser light is between the dynamic range of the first and the second amplifier 12a, 12c and the A/D converters 12b, 12d.

The irradiation time of the certifying laser light is shorter than the predetermined time interval. This is because that it is necessary to irradiate the certifying laser light and the measurement laser light during the predetermined time interval.

The certifying laser light is emitted from the laser diode 2 toward the surface of the object and the reflected light enters the photo diode 12 through the half mirror 11. The amount of the reflected light of the certifying laser light is measured with the incident light measurement device (refer to a waveform indicated by "PD input" of FIG. 4). When the surface of the object is dark or the distance between the object and the shape measurement apparatus is long, the amount of the reflected light decreases. When the surface of the object is light or metallic, or the distance between the object and the shape measurement apparatus is short, the amount of the reflected light increases.

The measurement value of the amount of the reflected light of the certifying laser light is digitized with the A/D converters 12b, 12d and inputted to the FPGA 20. In this embodiment, the FPGA 20 determines the irradiation time of the measurement laser light of the laser diode 2 based on the amount of the certifying laser light. When the amount of the reflected light of the certifying laser light is large, the irradiation time of the measurement laser light is shortened, and when the amount of the reflected light thereof is small, the irradiation time of the measurement laser light is prolonged.

The adjustment of the irradiation time of the measurement laser light controls the amount of the reflected light thereof so that the amount of the reflected light is within a suitable range of electrical charges of the respective CCDs of the line sensor 13a of the CCD line sensor portion 13. When the amount of the reflected light of the measurement laser light is larger than the amount of the electrical charges storable in the CCD device, the CCD device can not correctly measure the amount of the light. When the amount of the reflected light thereof is too small, it is difficult to distinguish between the reflected light and noise. The suitable range of the electrical charges of the CCD device is between the electrical charges storable in the CCD device (upper limit) and the electrical charges larger than the noise level (lower limit).

The FPGA 20 controls the laser diode driver 2a so that the laser diode 2 emits the light based on the determined irradiation time of the measurement laser light. The light intensity of the laser diode 2 is predetermined and the emission time thereof is adjusted. Accordingly, the emission of the laser diode 2 has a pulse waveform (refer to the waveform indicated by "measurement laser ON 1" in FIG. 4).

When the measurement laser light is reflected from the surface of the object and enters the CCD device of the line sensor 13a of the CCD line sensor portion 13, the CCD device received the measurement laser light is specified and the imaging position of the reflected light is determined. The amount of the reflected light of the measurement laser light is measured with the FPGA 20 through the CCD driver 13b.

Since the amount of the reflected light entering the CCD device is in the range of the electrical charges storable in the CCD device regardless of the reflectivity of the surface of the object and the distance between the object and the shape measurement apparatus, the amount of the reflected light of the measurement laser light is correctly measured.

The laser diode 2 emits both the certifying laser light and the measurement laser light as the pulse laser. Heat generation is thus reduced and the variation of the amount of light of the laser diode 2 due the heat is thus prevented. The pulsating emission of the laser diode 2 allows a large amount of light of the laser diode 2 which improves the S/N ratio of the photo diode 12.

In this embodiment, the measurement laser light emitted from the laser diode 2 has the predetermined light intensity and the emission time of the measurement laser light is adjusted. It is also possible that the emission time is determined beforehand and the light intensity is adjusted with the FPGA 20. The suitable range of the electrical charges of the CCD device of the line sensor 13a is between the electrical charges storable in the CCD device (upper limit) and the electrical charges higher than the noise level (lower limit). It is necessary to control the emission time and the intensity of the laser diode 2 not to run over this range. The waveform indicated by "measurement laser ON 2" of FIG. 4 is pertinent to this case. The measurement laser ON 1 and the measurement laser ON 2 each have the same value of the product of the emission time and the light intensity.

The correct three-dimensional shape of the surface of the object is obtained from the data outputted from the CCD device. The contrast information of the surface of the object is generated from the data obtained from the incident light measurement device.

The incident light measurement device includes the photo diode 12, the first and the second amplifier 12a, 12c, and the A/D converters 12b, 12d, and has the wide dynamic range in response to the large and small amount of the reflected light. The contrast information is thus correctly obtained regardless of the amount of the reflected light. The luminance measured with the each CCD device of the line sensor 13a can also be utilized for the contrast information. In this case, the emission time of the measurement laser light is predetermined and the light intensity is only adjusted (refer to the waveform indicated by "measurement laser ON 2"), and the contrast information is obtained from the corrected light intensity.

The computer 30 generates the correct three-dimensional shape data with the coordination data of the CMM inputted to the computer 30, the data of rotation angle of the entire case of the shape measurement apparatus, the data of the rotation position of the encoder 6a, and the distance measured with the respective CCDs of the line sensor 13a.

The computer 30 combines the three-dimensional shape data with the contrast information to generate the three-dimensional image of the object.

Accordingly, the three-dimensional imaging apparatus of the embodiment generates a very clear and correct three-dimensional image by assigning the contrast information to the correct coordination of the three-dimensional shape data.

Figure 5:
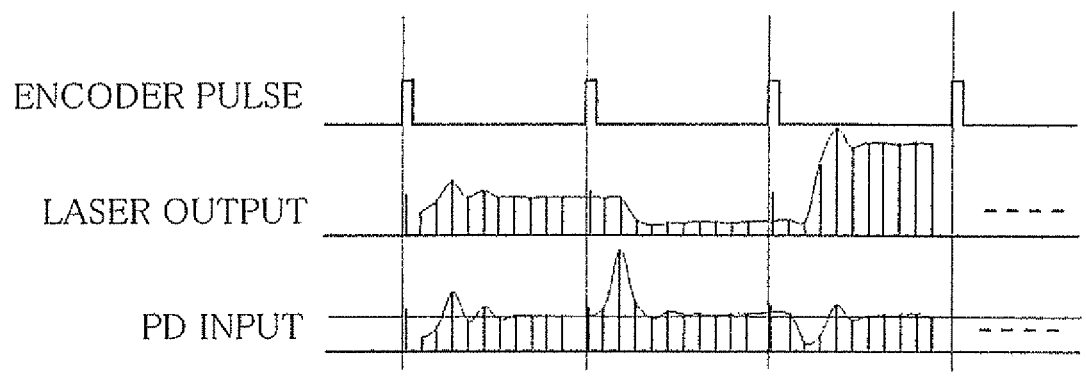
FIG. 5 is a timing chart of a control system of a shape measurement apparatus of a three-dimensional measurement apparatus of a second embodiment of the present invention.
Figure 6:
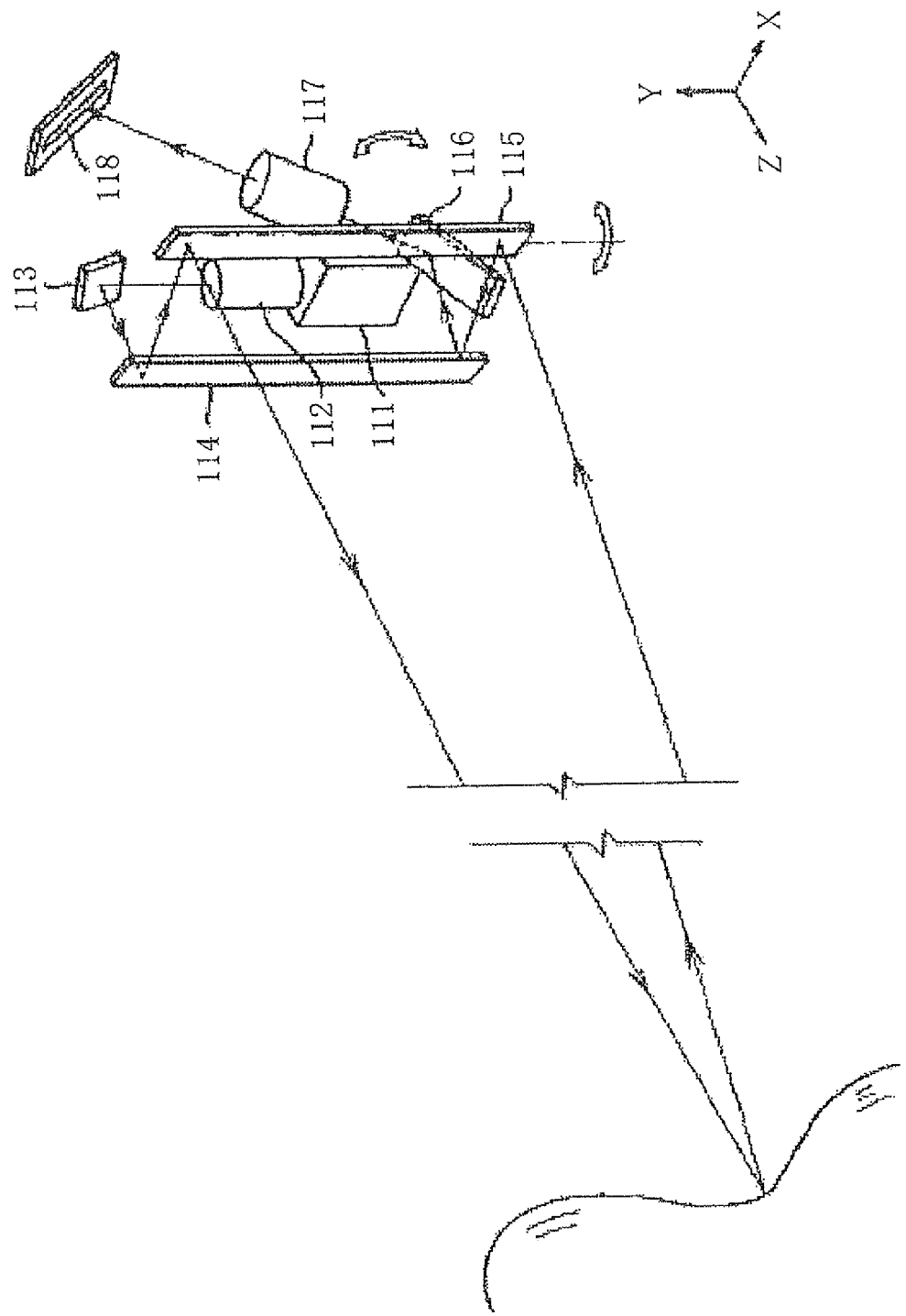
FIG. 6 is a schematic view of an optical unit of a shape measurement apparatus of a conventional three-dimensional imaging apparatus.
Figure 7:
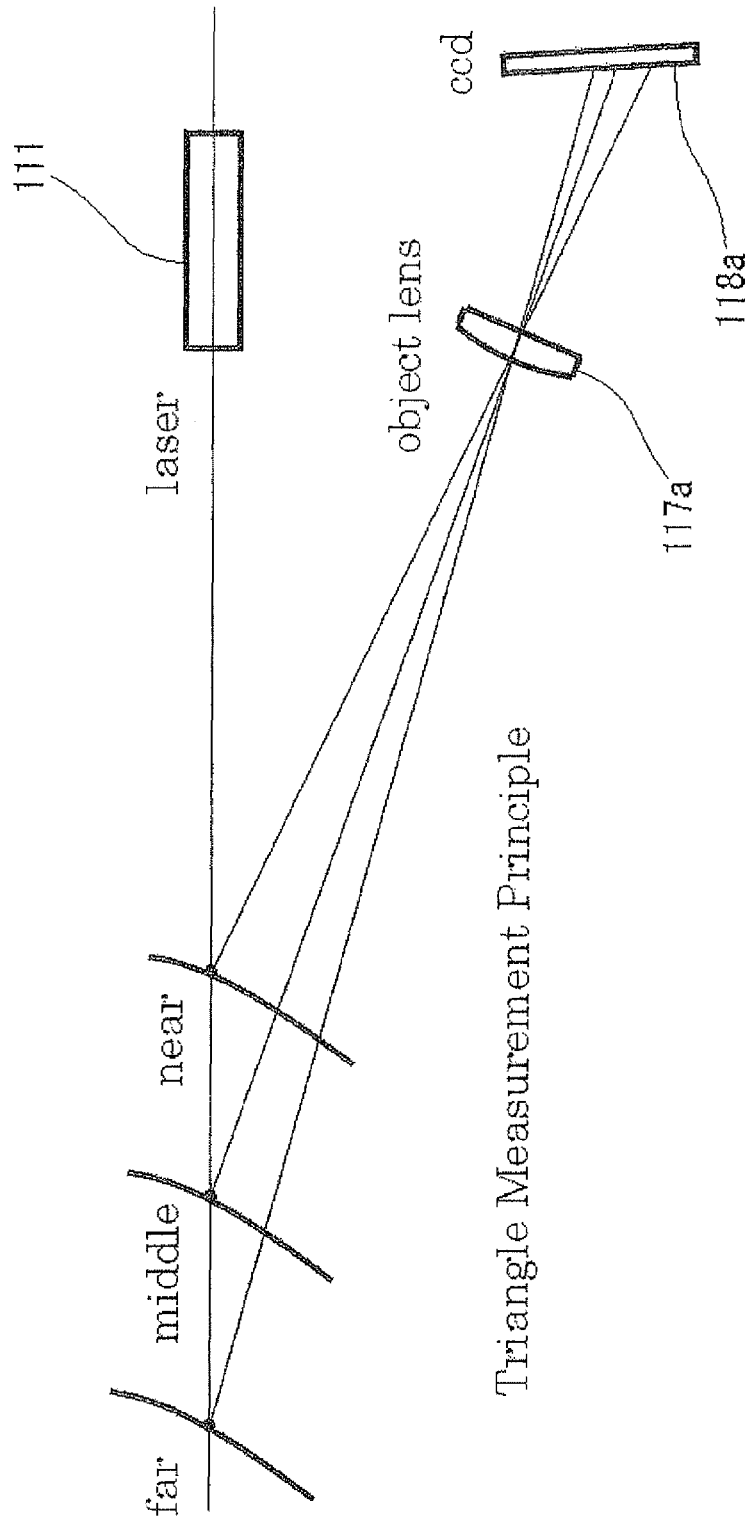
FIG. 7 illustrates a principle of measurement of the shape measurement apparatus of FIG. 6.
Figure 8:
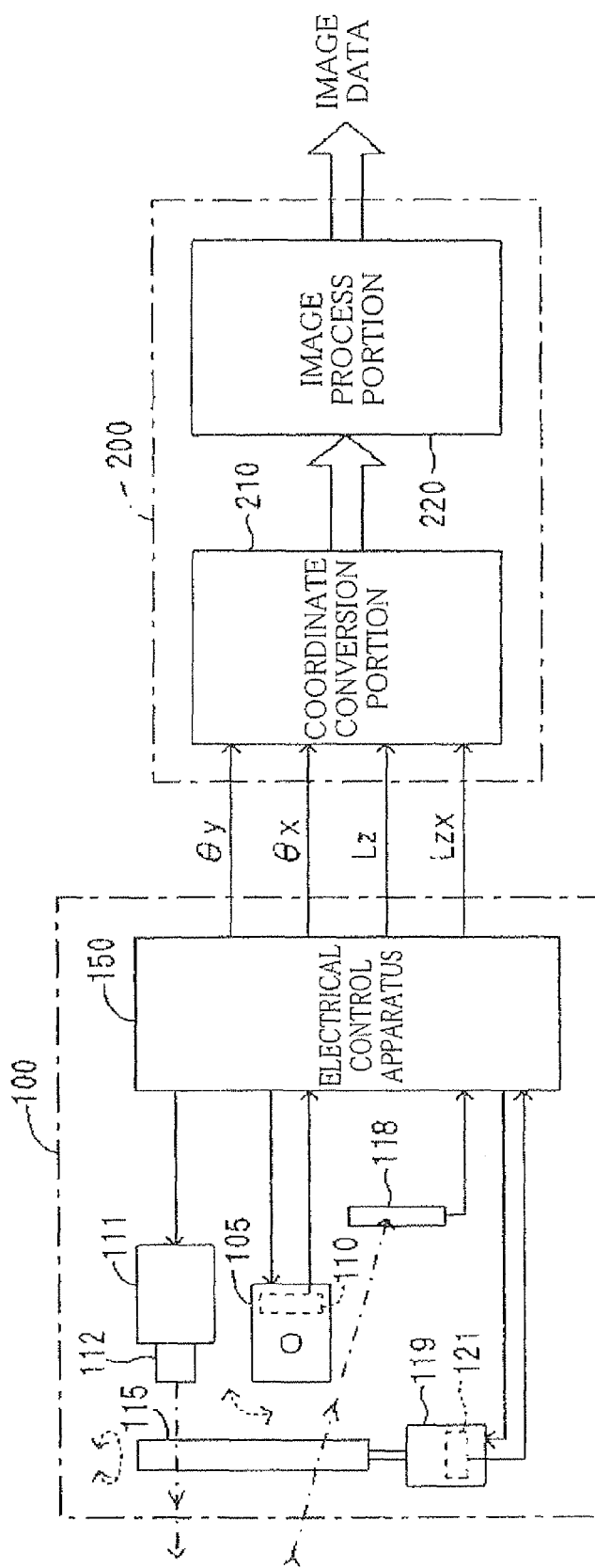
FIG. 8 is a block diagram showing a configuration of the shape measurement apparatus of FIG. 6.
Figure 9:
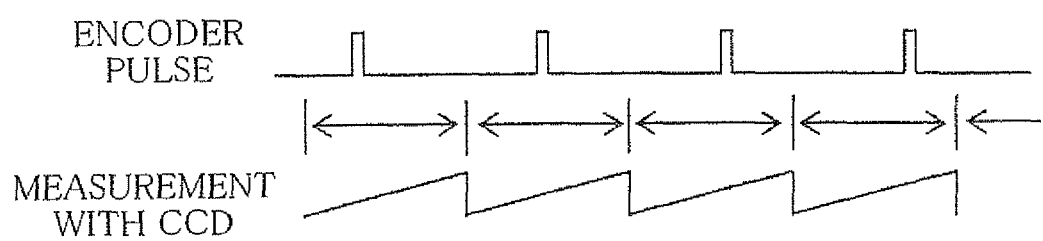
FIG. 9 is a timing chart of a control system of the shape measurement apparatus of FIG. 6.

FIG. 5 illustrates a second embodiment of the present invention. The second embodiment has the same configuration as the first embodiment. A difference between the first embodiment and the second embodiment is the following. The measurement laser light is irradiated more than once during the predetermined time interval and the incident light measurement device measures the amount of one measurement laser light. The intensity of the next measurement laser light irradiated by the laser diode 2 is determined with the amount of the one measurement laser light measured with the incident light measurement device.

The detection signals outputted from the encoder 6a are inputted to the FPGA 20 to generate the timing signals (refer to the waveform indicated by "encoder pulse" of FIG. 5) similar to the first embodiment. The laser diode driver 2a is controlled with the timing signals and the certifying laser light is emitted from the laser diode 2 (refer to "pulse 1" of "laser output" of FIG. 5). The light intensity of the certifying laser is also predetermined similar to the first embodiment.

When the reflected light of the certifying laser light enters the photo diode 12 and the amount of the reflected light of the certifying laser light is measured, the FPGA determines the light intensity of a first measurement laser light from the measured value. Emission of the laser diode 2 irradiating the first measurement laser light is a pulse waveform and the emission time is predetermined.

The first measurement laser light is irradiated to the surface of the object to be measured and the laser light reflected from the surface of the object enters the photo diode 12. The amount of the reflected light of the first measurement laser light is measured and the FPGA 20 determines the light intensity of a second measurement laser light from the measured value. The second measurement laser light is also pulse waveform same as the first measurement laser light and the emission time thereof is predetermined. The second measurement laser light is irradiated and the amount of the reflected light is measured to determine the light intensity of a third measurement laser light.

One measurement laser light is utilized as the certifying laser light to determine the light intensity of the next measurement laser light. In the second embodiment, the multiple measurement laser lights are utilized as the multiple certifying laser lights. The amount of the reflected light of the measurement laser light is correctly measured without influence of the reflectivity of the surface of the object and the distance between the object and the shape measurement apparatus. The amount of the reflected light of the measurement laser light entering the CCD device is always in the range of the electrical charges storable in the CCD device. Accordingly, the amount of the reflected light of the measurement laser light is thus correctly measured.

The second embodiment also generates the three-dimensional image by combining the correct three-dimensional shape of the surface obtained by the CCD device with the contrast information of the surface of the object similar to the first embodiment.

Contrary to the first embodiment, the incident light measurement device receives the multiple measurement laser lights during the predetermined time interval between one timing signal and the next timing signal of the encoder 6a. The amount of the reflected light of the measurement laser light measured with the photo diode 12 contains the different light intensity. Also in the second embodiment, the certifying laser light is first emitted with the timing of the encoder and the input free from the optimized feedback becomes the contrast information.

The computer 30 of the second embodiment generates the correct three-dimensional shape data with the coordination data of the CMM inputted to the computer 30, the data of rotation angle of the entire case of the shape measurement apparatus, the data of rotation position of the encoder 6a, and the distance measured with the respective CCDs of the line sensor 13a. The computer 30 generates the three-dimensional image of the object by combining the correct three-dimensional shape data with the contrast information.

Accordingly, the three-dimensional imaging apparatus of the embodiment generates a very clear and correct three-dimensional image by assigning the contrast information to the correct coordination of the three-dimensional shape data.

Figure 10:
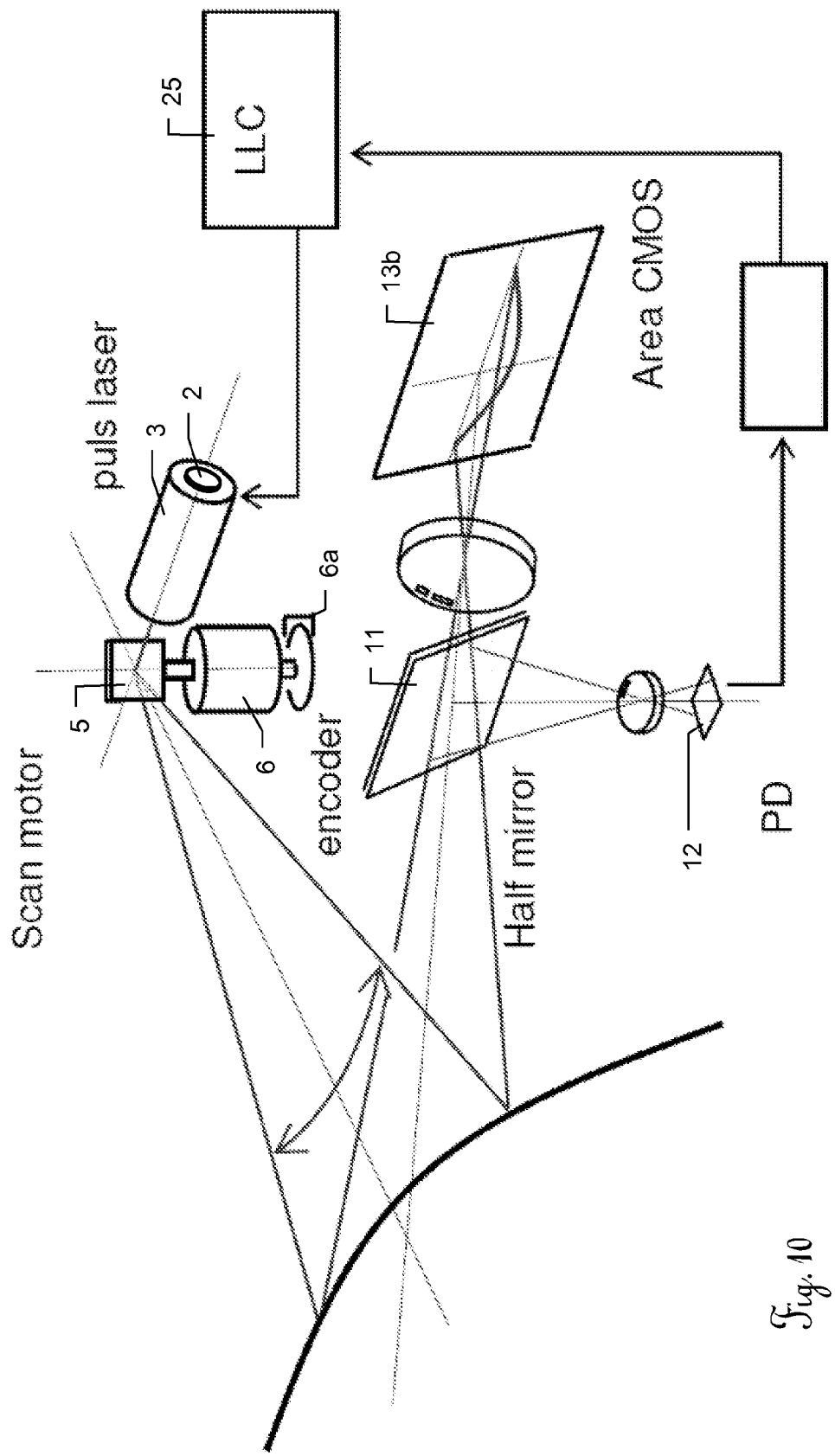
FIG. 10 is a perspective view of an optical unit of a shape measurement apparatus of a three-dimensional imaging apparatus of a third embodiment of the present invention.

FIG. 10 schematically shows a scanning apparatus according to the invention similarly to the embodiment depicted in FIG. 1. However, instead of a CCD line sensor as shown in FIG. 1, an area sensor 13b—particularly a CCD-matrix array or an area CMOS sensor—is used as photosensitive positional detector for measuring an imaging position of the reflected laser light received by the second optical unit.

Again, the a laser diode 2—as laser source—is present in order to emit a laser light, i.e. the certifying laser light as well as the measurement laser light.

The first optical unit includes at least a beam expander 3 and a mirror 5, wherein the mirror 5 is swung back and forth within a given angular range by a swing motor 6. Therefore, the swing motor 6 is part of the movement device for sweeping back and forth the irradiation position of the laser light emitted from the laser diode. The angular encoder 6a acts as detection device for detecting movement of the sweeping motor.

The second optical unit comprises—in the simplified embodiment being depicted—the partially transmitting mirror 11 and imaging lens portions.

Because an area sensor 13b is used as photosensitive positional detector in this embodiment, the second optical unit—which receives the reflected laser light—does not comprise a swinging mirror being also connected to the shaft of the swing motor 6. In order to determine distances to points of the surface of the object being irradiated by the measurement laser light, the area sensor 13b can be read out row-by-row (and the distances can be derived according to the principle of triangulation).

A photodiode 12 is disposed to receive the light reflected from the partially transmitting mirror 11 and to detect the amount of the reflected light.

According to the invention, a plurality of timing signals are generated having a predetermined time interval, wherein the timing signals control a reset timing of the sensor elements of the area sensor 13b.

In order to control an amount of the measurement laser light emitted from the laser source, a certifying laser light is irradiated from the laser source for a period of time shorter than the predetermined time interval and an amount of the certifying laser light reflected from the surface of the object is measured with the incident light measurement device. Hence, the amount of the measurement laser light emitted from the laser source can be determined dependent on the amount of the certifying laser light measured with the incident light measurement device.

Figure 11:
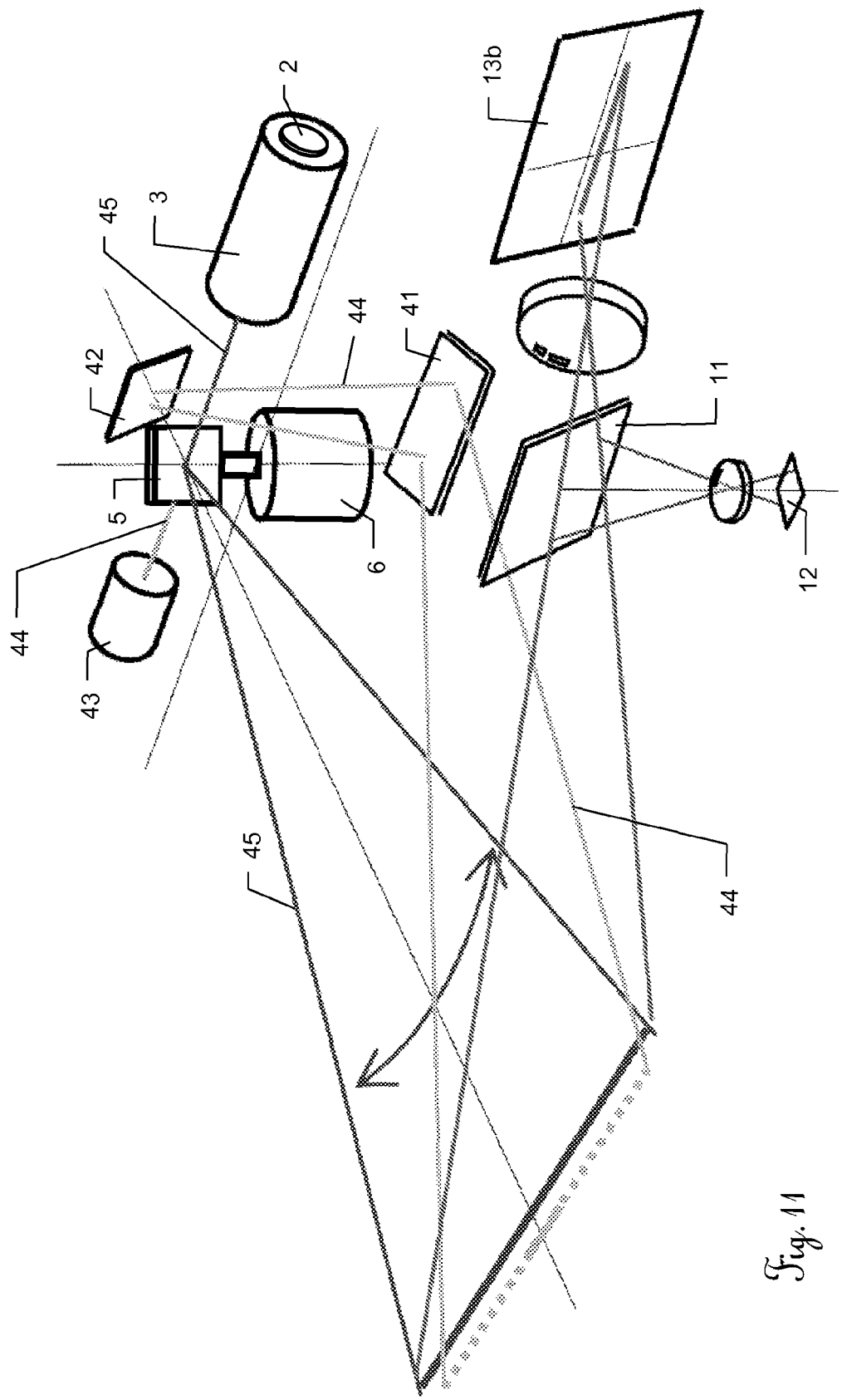
FIG. 11 is a perspective view of an optical unit of a shape measurement apparatus of a three-dimensional imaging apparatus of a forth embodiment of the present invention.
Figure 12:
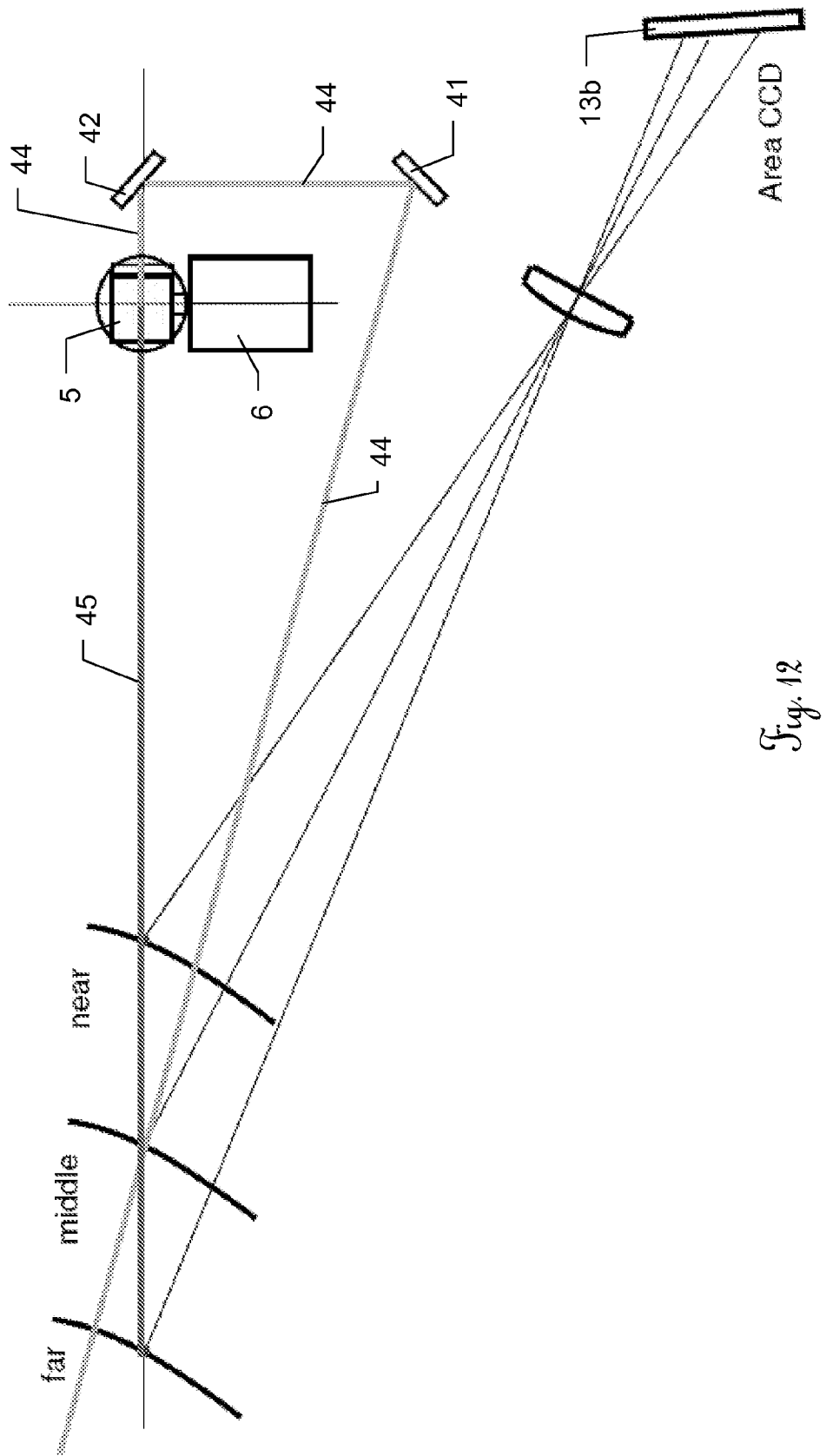
FIG. 12 is a block diagram showing a configuration of the shape measurement apparatus of the embodiment of FIG. 11.

FIGS. 11 and 12 schematically show a scanning apparatus according to the invention, similarly to the embodiment depicted in FIG. 10, further comprising at least one guiding light source—particularly a second laser diode 43—being built and arranged for irradiating a guiding beam 44 in the visible spectral range onto the surface of the object. Thereby, an emitting position of the guiding beam 44 is spaced apart from the emitting position of the measurement laser light 45 emitted by the laser diode 2. Furthermore, the guiding beam is irradiated inclined with respect to the measurement laser light in such a way, that the guiding beam 44 and the laser light 45 intersect at a predetermined optimal scanning offset distance (e.g. around 10 cm), which is given by the arrangement of the photosensitive detector 13b and a distance range within the reflected measurement laser light is detectable by the photosensitive detector 13b.

Hence, the guiding beam 44 is projected onto the surface of the object in order to indicate a correct or optimal measuring distance.

Therein, the irradiation position of the guiding beam 44 can be swept back and forth—similarly to the measurement laser light 45—also on behalf of the swing motor 6 (movement device) and the swinging mirror 5.

The guiding beam 44 is then directed along a third optical path by a third optical unit and irradiated from mirror 41 towards the surface of the object.

The guiding beam 44 generated in this manner serves as an adjusting aid to bring the scanning apparatus into an optimal position (distance and location) relative to the object to be measured. As shown, this condition is provided when the line—generated onto the object-surface by the measurement light 45—falls together with the guiding line projected by the sweeping guiding beam 44.

Hence, the guiding beam 44 is swept back and forth and projected onto the surface of the object in such a way, that the projection appears (i.e. for human eyes) as guiding line on the surface of the object, particularly as guiding line being dashed so as to allow for easily distinguishing the guiding line from the measurement line projected by the measurement laser light 45. The dashed guiding line may e.g. be generated by appropriately controlling emitting time intervals of the guiding light source over time.

Exemplarily, for providing ease of use, the guiding beam 44 of the guiding light source 43 and the laser light 45 of the laser source 2 may have different colours (e.g. orange and red, respectively).

Figure 13:
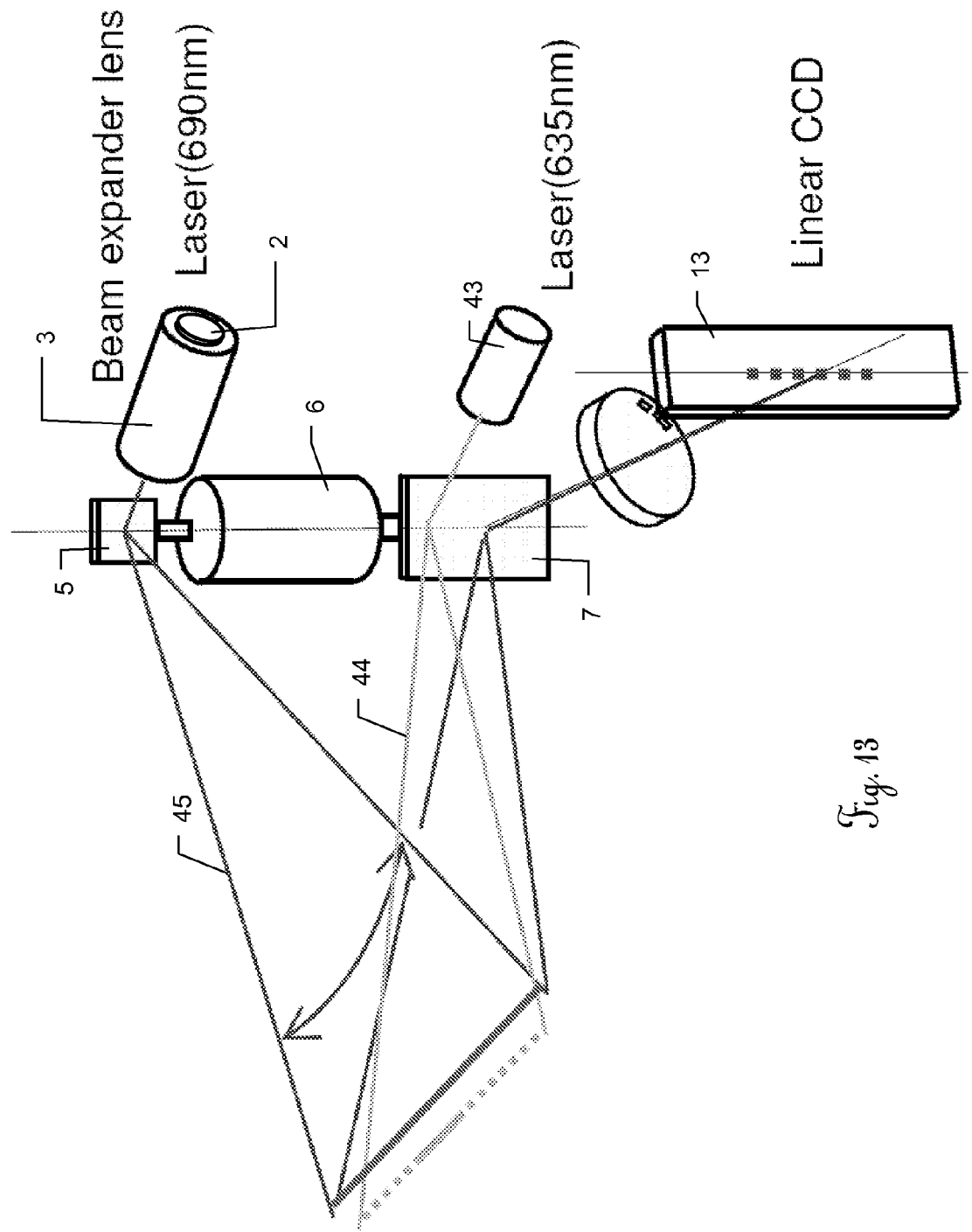
FIG. 13 is a perspective view of an optical unit of a shape measurement apparatus of a three-dimensional imaging apparatus of a fifth embodiment of the present invention.

FIG. 13 shows a combination of the embodiments shown in FIG. 1 and FIG. 11. In this embodiment, the scanning apparatus again comprises a second laser diode 43 acting as guiding light source.

However, the guiding laser beam 44 is directed onto and irradiated by mirror 7 of the second optical unit, which mirror is designed for receiving the laser light reflected from the surface of the object and is swinging back and forth on behalf of swing motor 6. Therefore, the guiding beam 44 automatically generates an imaginary guiding line of identical length as the measurement line projected by the measurement laser light 45, wherein the guiding line and the measurement line are parallel.

Optionally, as already mentioned in connection with FIG. 11, the guiding line may be projected as dashed line by on/off modulation of the power control of the guiding light source 43 over time.

Summarised, this feature is provided for guiding the user while scanning. The scanning apparatus projects an accurate dashed line showing an optimal scanning offset distance. This enables the user to quickly become familiar with good scanning practices.

Although the invention has been illustrated above, partly with reference to some preferred embodiments, it must be understood that numerous modifications and combinations of different features of the embodiments can be made. All of these modifications lie within the scope of the appended claims.

What is claimed is:

1. A scanning apparatus for generating a three-dimensional image of a surface of an object to be measured, comprising:
    a laser source for emitting a laser light;
    a first optical unit for irradiating the laser light emitted from the laser source towards the surface of the object;
    a second optical unit for imaging the laser light reflected from the surface of the object;
    a photosensitive detector having a plurality of sensor elements, for detecting an imaging position of the laser light from the second optical unit;
    an incident light measurement device for measuring an amount of received laser light, which corresponds to the amount of laser light entering the photosensitive detector; and
    a processing unit for controlling the scanning apparatus in such a way, that:
        a plurality of timing signals are generated having a predetermined time interval;
        the timing signals control a reset timing of a sensor element of the photosensitive detector;
        a certifying laser light is irradiated from the laser source after one timing signal for a period of time shorter than the predetermined time interval;
        an amount of the certifying laser light reflected from the surface of the object is measured with the incident light measurement device; and
        an amount of the measurement laser light emitted from the laser source is determined dependent on the amount of the certifying laser light measured with the incident light measurement device.

2. The apparatus as claimed in claim 1, wherein the laser source is built as a laser diode.

3. The apparatus as claimed in claim 1, wherein the photosensitive detector is built as a line sensor, particularly a CCD line sensor, or as an area sensor, particularly a COD-matrix array or an area CMOS sensor.

4. The apparatus as claimed in claim 1, further comprising:
    a movement device for moving an irradiation position of the laser light emitted from the laser diode; and
    a detection device for detecting movement of the movement device;
    wherein the plurality of timing signals are generated by a detection signal outputted from the detection device.

5. The apparatus as claimed in claim 1, wherein the plurality of timing signals are triggered by the control unit.

6. The apparatus as claimed in claim 1, wherein an output of the incident light measurement device is considered for the determination of contrast information of the surface of the object to be measured.

7. The apparatus as claimed in claim 1, wherein the amount of the measurement laser light is considered for the determination of contrast information of the surface of the object to be measured.

8. The apparatus as claimed in claim 1, wherein the amount of the measurement laser light is determined dependent on a length of emission time of the laser source.

9. The apparatus as claimed in claim 1, wherein the amount of the measurement laser light is determined dependent on an intensity of light of the laser source.

10. The apparatus as claimed in claim 1, wherein:
    the measurement laser light is irradiated a plurality of times for the predetermined time interval;

the amount of one measurement laser light is measured with the incident light measurement device; and a next light intensity of the measurement laser light emitted from the laser source is determined dependent on the amount of the one measurement laser light determined with the incident light measurement device.

11. The apparatus as claimed in claim 1, wherein the incident light measurement device has a plurality of amplifiers in response to the intensity of the laser light.

12. The apparatus as claimed in claim 1, further comprising at least one guiding light source including a second laser diode being built and arranged for irradiating a guiding beam in the visible spectral range onto the surface of the object, wherein an emitting position of the guiding beam is spaced apart from the emitting position of the laser light emitted by the laser source; and wherein the guiding beam is irradiated inclined with respect to the laser light so that the guiding beam and the laser light intersect at an optimal scanning offset distance.

13. The apparatus as claimed in claim 12, wherein an irradiation position of the guiding beam is swept back and forth on behalf of the movement device.

14. The apparatus as claimed in claim 13, wherein the guiding beam is irradiated and projected onto the surface in such a way that it appears as guiding line on the surface of the object.

15. The apparatus as claimed in claim 13, wherein the guiding beam is irradiated and projected onto the surface in such a way that it appears as guiding line on the surface of the object as dashed guiding line by controlling emitting intervals of the guiding light source over time.

16. The apparatus as claimed in claim 13, wherein the guiding is emitted either from that mirror of the second optical unit, which is designed for receiving the laser light reflected from the surface of the object, or from a third optical unit for irradiating the guiding beam of the guiding light source towards a surface of the object.

17. The apparatus as claimed in claim 13, wherein the guiding beam of the guiding light source and the laser light of the laser source have different colors.

* * * * *